United States Patent
Menon et al.

(10) Patent No.: US 9,684,338 B1
(45) Date of Patent: Jun. 20, 2017

(54) MULTIFUNCTIONAL LAYER FOR A DISPLAY DEVICE

(71) Applicant: Amazon Technologies, Inc., Seattle, WA (US)

(72) Inventors: Anoop Menon, Capitola, CA (US); Kari Juhani Rinko, Helsinki (FI); Joel Martin Pollack, San Jose, CA (US); Weihsin Hou, Fremont, CA (US); Chin Siong Khor, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 48 days.

(21) Appl. No.: 14/642,412

(22) Filed: Mar. 9, 2015

(51) Int. Cl.
G06F 3/041 (2006.01)
G06F 1/16 (2006.01)
G06F 3/044 (2006.01)
F21V 8/00 (2006.01)

(52) U.S. Cl.
CPC .......... *G06F 1/1643* (2013.01); *G02B 6/0011* (2013.01); *G02B 6/0065* (2013.01); *G06F 3/044* (2013.01); *G06F 3/0412* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 2004/0223089 A1* | 11/2004 | Hong | ....................... | G06F 3/046 349/12 |
| 2010/0182250 A1* | 7/2010 | Kang | ..................... | G06F 3/0416 345/173 |
| 2014/0062939 A1* | 3/2014 | Zehner | ..................... | G06F 3/044 345/174 |
| 2014/0192006 A1* | 7/2014 | Rathnam | ............... | G06F 3/0412 345/174 |
| 2015/0004382 A1* | 1/2015 | Menon | .................... | G06F 3/147 428/212 |
| 2016/0062527 A1* | 3/2016 | Lee | ........................ | G06F 3/044 345/173 |
| 2016/0132145 A1* | 5/2016 | Fourie | ..................... | G06F 3/044 345/174 |
| 2016/0147006 A1* | 5/2016 | Large | .................. | G02B 6/0036 349/62 |
| 2016/0170250 A1* | 6/2016 | Ghali | .................... | G06F 1/1692 359/296 |

* cited by examiner

*Primary Examiner* — Nalini Mummalaneni
*Assistant Examiner* — Christopher Kohlman
(74) *Attorney, Agent, or Firm* — Eversheds Sutherland (US) LLP

(57) ABSTRACT

A multifunctional device layer may include a lightguide substrate having an optically patterned surface and an opposing non-patterned surface. The non-patterned surface of the lightguide substrate is coated with a first material having a first refractive index and the patterned surface is coated with a second material having a second refractive index. The first refractive index may be lower than the second refractive index and each may be lower than a refractive index of the lightguide substrate. A touch sensor may be formed on the coated non-patterned surface of the lightguide substrate, the coated patterned surface, or on an interstitial layer deposited on the coated non-patterned surface or the coated patterned surface. An anti-glare/anti-reflective coating potentially having ultraviolet (UV) absorption properties may be applied to the touch sensor.

17 Claims, 5 Drawing Sheets

MULTIFUNCTIONAL LAYER FOR A DISPLAY DEVICE

BACKGROUND

Electronic display devices typically include several functional layers that are adhered to one another through the use of adhesives and lamination processes. For example, an electronic display device such as a smartphone, tablet, electronic reader ("e-reader"), or the like may include a display stack that includes a display layer, driving circuitry (e.g., a thin-film transistor (TFT) substrate), electrode layer(s), polarizing layer(s), and so forth. The display layer may be, for example, an emissive electroluminescent layer in the case of organic light-emitting diode (OLED) devices, a liquid crystal layer in the case of liquid crystal devices (LCDs), a liquid polymer layer containing microcapsules filled with electrically charged pigmented particles in the case of an electrophoretic display, or the like. Other functional layers may be provided in addition to the display stack such as, for example, multiple touch sensor layers. With the addition of each such functional layer the design complexity and cost of manufacturing the electronic display device increases.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
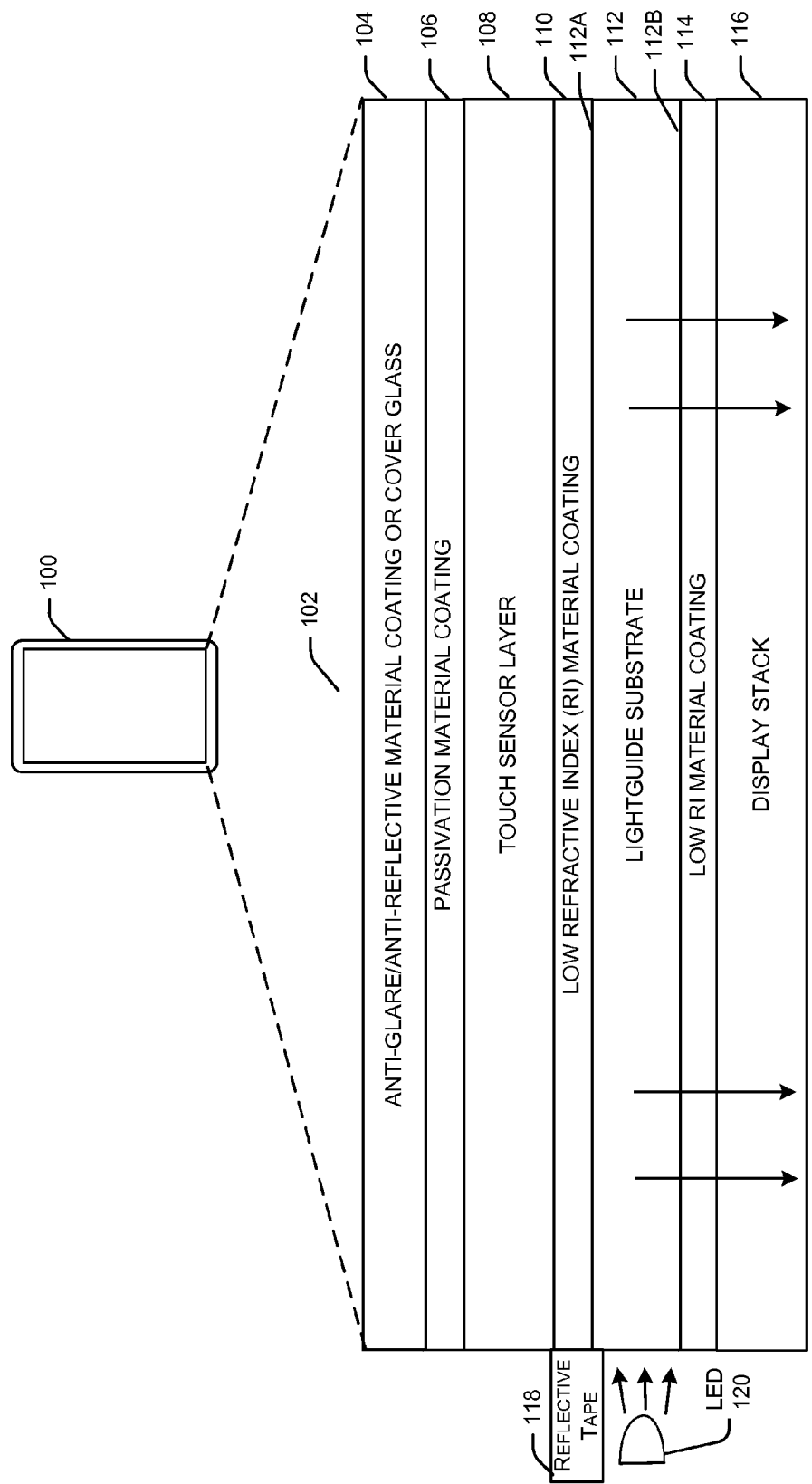
FIG. 1 is a schematic cross-section of a multifunctional device layer in accordance with one or more example embodiments of the disclosure.

This disclosure relates to, among other things, a multifunctional device layer for a display device. The multifunctional device layer may combine, into a single, integrated structure, functionality provided by multiple independently formed layers of existing display devices. In one or more example embodiments of the disclosure, the multifunctional device layer may include a lightguide substrate. The lightguide substrate may have a first surface and a second surface that opposes the first surface. One of the first surface or the second surface of the lightguide substrate may include optical patterns or other light extraction features formed therein that allow light reflecting within the lightguide to be directed out of the substrate towards a display stack of a device into which the multifunctional device layer may be incorporated.

For ease of explanation, the surface of the lightguide that includes the optical patterns or other light extraction features may be referred to herein as the patterned surface and the opposing surface of the lightguide may be referred to as the non-patterned surface. In addition, in certain example embodiments, one of the first surface or the second surface of the lightguide substrate may be assumed to be the patterned surface (and thus the opposing surface may be assumed to be the non-patterned surface) for ease of explanation.

In certain example embodiments, one or both of the patterned surface or the non-patterned surface of the lightguide substrate may be coated with a respective material. The coating material may have a refractive index that is less than a refractive index of the material from which the lightguide substrate is formed. In those example embodiments in which both surfaces of the lightguide substrate are coated, the material used to coat the patterned surface may be the same material or a different material from the material used to coat the non-patterned surface. If different materials are used, each material may have a respective refractive index that is less than a refractive index of the lightguide substrate. A low refractive index material may serve to increase internal reflection of light within the lightguide to ensure that most of the light being internally reflected in the lightguide substrate is directed to the display via the optical patterns formed in the patterned surface. In addition, the material chosen for the coating may have a refractive index that reduces Fresnel reflection of light at an interface between the lightguide substrate and the material. In certain example embodiments, a material that interfaces with a coated surface of the lightguide substrate may have a refractive index that is greater than or equal to the refractive index of the coating material. A surface of the lightguide substrate that has been coated with a low refractive index material may be referred to herein as a coated surface.

In certain example embodiments, one or more touch-sensing components may be formed on one of the coated first surface or the coated second surface of the lightguide substrate. For example, one or more touch-sensing components (e.g., conductive electrode(s)) may be formed on the coated non-patterned surface of the lightguide substrate or the coated patterned surface of the lightguide substrate. The touch-sensing components may utilize resistive or capacitive touch-sensing technology. The one or more touch-sensing components may be collectively referred to herein as a touch sensor or touch sensor layer. In those example embodiments in which the touch sensor is a capacitive touch sensor, the touch sensor may be self-capacitance touch sensor or a mutual capacitance touch sensor.

In certain example embodiments, the touch sensor may be formed using a metal mesh technology. For example, a metal layer may be deposited on the coated non-patterned surface or the coated patterned surface of the lightguide substrate and selectively etched using photolithography to form metal conduction islands. As another example of a metal mesh process for forming the touch sensor, a pattern of metal conduction islands may be printed onto the coated non-patterned surface or the coated patterned surface of the lightguide substrate. The metal used may be silver (e.g., silver nanowire), copper, or the like. Using a metal mesh technology as described above, a single touch sensor layer may be formed having a grid formation with multiple rows and columns (e.g., multiple (x,y) coordinates of the touch sensor).

As another example, indium tin oxide (ITO) may be used to form the touch sensor. More specifically, ITO may be deposited on the coated non-patterned surface or the coated patterned surface of the lightguide substrate. Various portions of the deposited ITO layer may then be etched using, for example, photolithography to obtain ITO conduction islands. A dielectric layer may then be deposited between the conduction islands to generate an array of touch-sensing electrodes capable of being mapped by a touch controller to (x,y) coordinate pairs.

As yet another example, the touch sensor may be fabricated from graphene. Graphene contains carbon atoms arranged in a regular hexagonal pattern. Graphene is typically more optically transparent than ITO (e.g., has a lower refractive index) and has high intrinsic mobility and thermal conductivity. These properties of graphene may make it a desirable substitute to ITO for forming the touch sensor in certain example embodiments. In addition, as yet another example, carbon nanotubes may be used to form the touch sensor.

While example techniques have been described above for forming the touch sensor, it should be appreciated that any of a wide variety of techniques may be employed. For example, techniques that may be used to fabricate the touch sensor include, but are not limited to, micro-printing, silk printing, masking with vapor deposition, fine inkjet printing, screen printing, photo-etching, dipping the lightguide substrate into a solution of carbon nano-particles, or any other suitable technique.

While the touch sensor has been described as being formed on the coated non-patterned surface or the coated patterned surface of the lightguide substrate, in certain example embodiments, an interstitial layer may first be deposited on the coated non-patterned surface or the coated patterned surface, and the touch sensor may be formed on this interstitial layer. The interstitial layer may be incorporated to facilitate bonding of the touch sensor to the lightguide substrate. As previously alluded to, the interstitial layer may have a refractive index that is greater than or equal to a refractive index of the material coating on the non-patterned surface or the material coating on the patterned surface of the lightguide substrate.

Further, in certain example embodiments, a passivation coating may be applied to the touch sensor. The material chosen for the passivation coating may have a dielectric constant that enables the touch sensor to detect multi-touch gestures. However, in certain example embodiments, such as those in which the touch sensor is a mutual capacitance touch sensor, the passivation layer may not be present.

In certain example embodiments, an anti-reflective and/or anti-glare coating may be applied to the touch sensor after the touch sensor is formed on the coated non-patterned surface of the lightguide substrate or on an interstitial layer deposited on the coated non-patterned surface. For example, a resin having anti-reflective and/or anti-glare properties may be coated on the touch sensor. In certain example embodiments, the resin may be blended with a material having ultraviolet (UV) light filtering properties. In other example embodiments, an anti-reflective/UV cut film may be laminated on the touch sensor. In still other example embodiments, a cover glass may be disposed on the touch sensor. In yet other example embodiments (such as those in which the touch sensor is formed on the coated patterned surface of the lightguide substrate), an anti-glare and/or anti-reflective coating may be applied to the low refractive index coating that is applied to the non-patterned surface of the light substrate.

In certain example embodiments, an optically clear adhesive (OCA) layer may be bonded or otherwise adhered to the coated patterned surface of the lightguide substrate. This OCA layer may be used to adhere the multifunctional layer to a display stack of a display device. In addition, because the OCA layer is adhered to the low refractive index coating that is applied to the patterned surface of the lightguide substrate (and not directly to a surface of the lightguide substrate itself as in conventional display device stacks), materials having higher refractive indices may be chosen for the OCA layer. That is, because the OCA layer does not interface directly with a surface of the lightguide substrate, it may be unnecessary to select a low refractive index material for the OCA layer. In certain example embodiments, the low refractive index material coating applied to the patterned surface of the lightguide substrate may itself serve as an adhesive layer for adhesion of the multifunctional layer to the display stack. Accordingly, in such example embodiments, a separate OCA layer may not be needed for adhesion of the multifunctional layer to the display stack.

As noted above, in certain example embodiments, the touch sensor may be formed on the coated patterned surface of the lightguide substrate. Stated another way, the touch sensor may be formed on a bottom (or lower) surface of the lightguide substrate to which a low refractive index material coating has been applied. The bottom (or lower) surface of the lightguide substrate may oppose a top (or upper) surface of the lightguide surface that is positioned more proximal to a surface of a display viewed by a user. In such example embodiments, a material having anti-glare and/or anti-reflective properties (as well as potentially UV light filtering properties) may be applied to the coated non-patterned surface of the lightguide substrate. In addition, an OCA layer may be provided between the touch sensor layer and a display stack to adhere the multifunctional layer to the display stack.

Example embodiments of the disclosure provide a number of technical features or technical effects. For example, a multifunctional device layer in accordance with example embodiments of the disclosure provides combined functionality (e.g., lightguide function, touch-sensing function, anti-reflective/anti-glare function, etc.) typically provided by a greater number of independently fabricated layers in a conventional display device. Moreover, by providing this combined functionality as part of a single, integrated structure, a multifunctional device layer in accordance with example embodiments of the disclosure requires fewer adhesive layers than what are required in conventional device stacks to adhere the greater number of independently formed layers present in conventional device stacks, and thus, fewer lamination steps. As a result, a multifunctional device layer in accordance with example embodiments of the disclosure results in cost savings, thickness reduction, weight reduction, and process step reduction as compared to conventional displays. In addition, because a multifunctional device layer in accordance with example embodiments of the disclosure includes fewer layers than a conventional device stack, the multifunctional device layer provides improved optical characteristics (e.g., enhanced optical transparency). It should be appreciated that the above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Multifunctional Device Layer Structures

FIG. 1 is a schematic cross-section of a multifunctional device layer 102 in accordance with one or more example embodiments of the disclosure. The multifunctional device layer 102 may be incorporated into a display device 100. The display device 100 may be, for example, a smartphone device, a tablet, a wearable computing device, or the like. The display device 100 may also be a non-mobile device such as, for example, a laptop computer, a computer monitor, or the like. It should be appreciated that the above examples are merely illustrative and not exhaustive and that the display device 100 may be any suitable device into which a multifunctional device layer in accordance with example embodiments of the disclosure may be incorporated.

The multifunctional device layer 102 may combine the functionality of multiple independently formed layers of existing display devices into a single, integrated layer. In one or more example embodiments of the disclosure, the multifunctional device layer 102 may include a lightguide substrate 112. The lightguide substrate 112 may be formed from a copolymer material such as a cyclic olefin copolymer. In other example embodiments, the lightguide substrate 112 may be formed from poly(methyl methacrylate) (PMMA), glass, or other material having suitable optical transparency (e.g., a refractive index at or below some threshold value).

The lightguide substrate 112 may have a first surface 112A and a second surface 112B that opposes the first surface 112A. A surface of the lightguide substrate 112 that faces a display stack 116 of the device 100 (illustratively depicted in FIG. 1 as being the second surface 112B) may include optical patterns or other light extraction features (not shown in FIG. 1) that allow light reflecting within the lightguide substrate 112 to be directed out of the substrate 112 towards the display stack 116 of the display device 100. For ease of explanation, the surface 112A may be referred to herein as the non-patterned surface and the surface 112B may be referred to as the patterned surface.

In certain example embodiments, one or more both of the patterned surface 112B or the non-patterned surface 112A of the lightguide substrate 112 may be coated with a respective material. For example, the non-patterned surface 112A is depicted in FIG. 1 as being coated with the low refractive index material 110 and the patterned surface 112B is depicted as being coated with the low refractive index material 114. The coating materials 112, 114 may have respective refractive indices that are each less than a refractive index of the material from which the lightguide substrate 112 is formed. In those example embodiments in which both surfaces of the lightguide substrate 112 are coated, the material 114 used to coat the patterned surface 112B may be the same material or a different material from the material 110 used to coat the non-patterned surface 112A. Thus, as noted above, if the materials 110, 114 are different materials, their refractive indices may differ from each other, but nonetheless may each be less than a refractive index of the material from which the lightguide substrate 112 is formed. Further, in certain example embodiments, if materials 110, 114 are different materials, a refractive index of the material 110 may be less than a refractive index of the material 114, or vice versa.

One or more light sources (e.g., one or more light-emitting diodes (LEDs) 120) may be provided. The LEDs 120 may be provided if, for example, the display device 100 is a front-lit or edge-lit device such as, for example, a front-lit or edge-lit e-reader device. In certain example embodiments, the LEDs 120 may be provided along a side or edge of the lightguide substrate 112 such as, for example, within a bezel of the display device 100. Alternatively, the LEDs 120 may be provided at one or more corners of the display screen. Control circuitry (not shown in FIG. 1) may be provided for turning the LEDs 120 on and off in response to various detected conditions. For example, the control circuitry may include a user-activated switch or may include logic for determining when low-light conditions are present in an ambient environment and turning the LEDs 120 on under such conditions. In other example embodiments, the LEDs 120 may activate only a subset of the LEDs 120 or adjust an amount of power supplied to one or more of the LEDs 120 depending on the amount of ambient light detected. Light from the LEDs 120 and/or ambient light that enters the lightguide substrate 112 may be internally reflected within the lightguide substrate 112 and may be directed towards the display stack 116 of the device 100 by the optical patterns or other light extraction features of the patterned surface 112B of the lightguide substrate 112. In addition, reflective tape 118 may be provided for preventing light emitted by the LEDs 120 from reaching a viewer and to ensure that the emitted light enters the lightguide substrate 112.

A low refractive index material may serve to increase internal reflection of light within the lightguide substrate 112 to ensure that most light in the lightguide substrate 112 is directed to the display stack 116 via the optical patterns formed in the patterned surface 112B. In addition, the material chosen for the coating may have a refractive index that reduces Fresnel reflection of light at an interface between the lightguide substrate 112 and the material 110 (or 114). In certain example embodiments, a material that interfaces with a coated surface 112A or 112B of the lightguide substrate 112 may have a refractive index that is greater than or equal to the refractive index of the coating material.

In certain example embodiments, one or more touch-sensing components (collectively referred to herein as touch sensor layer 108) may be formed on the coating material 110 applied to the non-patterned surface 112A of the lightguide substrate 112. The touch sensor layer 108 may include a resistive or capacitive touch sensor. In those example embodiments in which the touch sensor layer 108 includes a capacitive touch sensor, the touch sensor may be self-capacitance touch sensor or a mutual capacitance touch sensor.

If the touch sensor layer 108 includes a capacitive touch sensor, it may include a layer of capacitive material containing capacitors or capacitive regions arranged according to a coordinate system. For example, a plurality of conductive electrodes may be arranged in a grid formation having multiple rows and columns (or another formation), where each row or column of conductive electrodes may be treated as a conductor (also referred to herein as a sensor line) having a certain amount of capacitance. When an object (e.g., a human's finger) comes into proximity or contact with a conductor (or a display screen, cover glass, or the like below which the touch sensor 108 is provided), the object may cause a change in capacitance of the conductor. This change in capacitance may be measured using, for example, a current meter, thereby enabling the location of the touch gesture to be determined (e.g., by determining the intersection of the affected row and column of conductive electrodes). For example, a touch controller (not shown) may be configured to detect changes in capacitance. A self-capacitance touch sensor may have relatively low power requirements and may generate relatively strong signals, but in certain cases, may not be able to resolve multi-touch gestures due to a phenomenon known as ghosting.

The touch sensor layer 108 may alternatively include a mutual capacitance touch sensor. A mutual capacitance touch sensor may utilize the same set of sensor lines or a different set of sensor lines that are configured to act as transmitters and receivers. For example, each column of conductive electrodes of the touch sensor layer 108 may be configured to transmit an electrical signal (e.g., generate an electric field) and each row of conductive electrodes of the touch sensor layer 108 may be configured as a receiver to receive the electrical signal (e.g., detect the electric field). When an object (e.g., a human's finger) comes into proximity or contact with the touch sensor layer 108 (or a display screen, cover glass, or the like below which the touch sensor layer 108 is provided), the object may cause a change in the electrical signal received by a receiving sensor line. A touch controller may be configured to determine a touch location based on this change in the electrical signal. A mutual capacitance touch sensor may be more accurate than a self-capacitance touch sensor in resolving the location of a multi-touch gesture, but at the same time, may have higher power requirements.

In certain example embodiments, the touch sensor layer 108 may be formed using a metal mesh technology. For example, a metal layer may be deposited on the coating material 112A and selectively etched using photolithography to form metal conduction islands. As another example of a metal mesh process for forming the touch sensor layer 108, a pattern of metal conduction islands may be printed onto the coating material 112A. The metal used may be silver (e.g., silver nanowire), copper, or the like. Using a metal mesh technology as described, a single touch sensor layer may be formed having a grid formation with multiple rows and columns (e.g., multiple (x,y) coordinates of the touch sensor 108).

As another example, indium tin oxide (ITO) may be used to form the touch sensor layer 108. More specifically, ITO may be deposited on the coating material 112A. Various portions of the deposited ITO layer may then be etched using, for example, photolithography to obtain ITO conduction islands. A dielectric layer may then be deposited between the conduction islands to generate an array of touch-sensing electrodes capable of being mapped by a touch controller to (x,y) coordinate pairs. In other example embodiments, the touch sensor layer 108 may be formed from graphene, carbon nanotubes, or the like.

While the touch sensor layer 108 is depicted in FIG. 1 as being formed on the coating material 110, in certain example embodiments, an interstitial layer (not shown) may first be deposited on the coating material 110, and the touch sensor layer 108 may be formed on this interstitial layer. The interstitial layer may be incorporated to facilitate bonding of the touch sensor to the lightguide substrate.

Further, in certain example embodiments, a passivation coating 106 may be applied to the touch sensor layer 108. The material chosen for the passivation coating 106 may have a dielectric constant that enables the touch sensor layer 108 to detect multi-touch gestures. However, in certain example embodiments, such as those in which the touch sensor layer 108 includes a mutual capacitance touch sensor, the passivation layer 106 may not be present.

In certain example embodiments, an anti-reflective coating and/or anti-glare coating 104 may be applied to the touch sensor layer 108 after the touch sensor layer 108 is formed on the coating material 110 or on an interstitial layer deposited on the coating material 110. For example, a resin having anti-reflective and/or anti-glare properties may be coated on the touch sensor layer 108. In certain example embodiments, the resin may be blended with a material having ultraviolet (UV) light filtering properties. In other example embodiments, an anti-glare/UV cut film may be laminated on the touch sensor layer 108. In other example embodiments, a cover glass 104 may be adhered to the touch sensor layer 108 using an optically clear adhesive (OCA) (not shown).

While the touch sensor layer 108 is depicted as being disposed on the coating 110, it should be appreciated that in certain example embodiments, the touch sensor layer 108 may be formed on the coating 114. That is, the touch sensor layer 108 may be provided below the lightguide substrate 112.

In certain example embodiments, an OCA layer (not shown) may be bonded or otherwise adhered to the coating material 114. This OCA layer may be used to adhere the multifunctional layer to the display stack 116 of the display device 100. In other example embodiments, the coating 114 may serve as an OCA for adhesion of the multifunctional device layer 102 to the display stack 116, in which case, a separate OCA layer may not be required.

In certain example embodiments, the side of the lightguide substrate 112 on which the touch sensor layer 108 is formed may be a "top side" facing "up" (e.g., towards a user and away from the display stack 116 and an opposing side of the lightguide substrate 112 may be facing "down" (e.g., away from the user and towards the display stack 116). It should be appreciated, however, that in various example embodiments, the touch sensor layer 108 may be facing "down" (e.g., towards the display stack 116 and away from a user) and the opposing side of the lightguide substrate 112 may be facing "up" (e.g., towards a user and away from the display stack 116).

The display or display stack 116 may be any suitable display including, but not limited to, an emissive display (e.g., an OLED display), a reflective display (e.g., an electrophoretic display, an electrowetting display, etc.), and a transmissive or transflective display (e.g., an LCD display), and so forth. Further, in certain example embodiments, the display stack 116 may be a backlit display, in which case, the multifunctional device layer 102 may be provided between the backlight and the display stack 116.

Figure 2A:
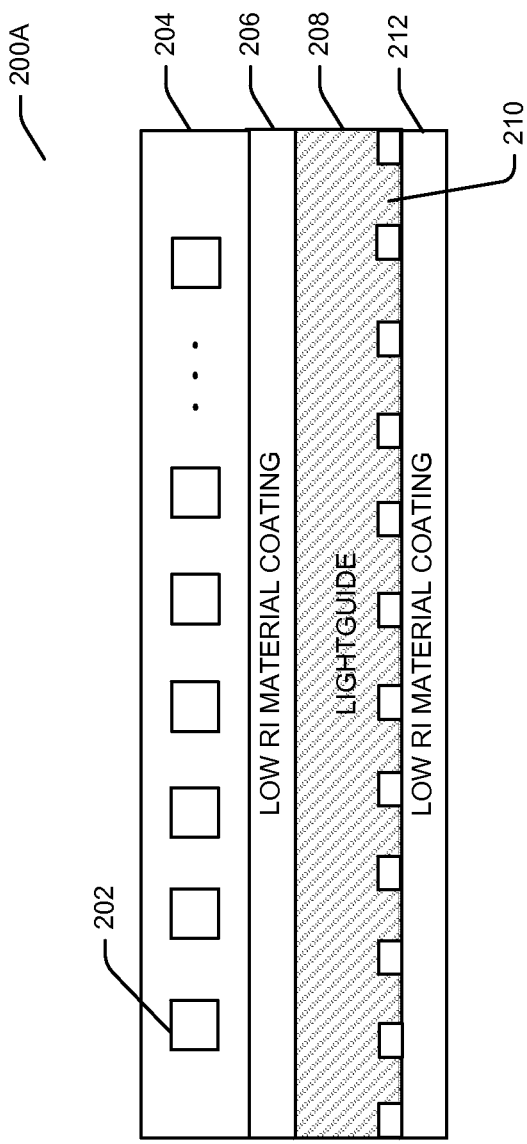
FIGS. 2A-2B are schematic cross-sections illustrating different configurations for a multifunctional device layer in accordance with one or more example embodiments of the disclosure.

FIG. 2A is a schematic cross-section of a portion 200A of a multifunctional device layer in accordance with one or more example embodiments of the disclosure. For ease of explanation, certain portions of the structure of the multifunctional device layer 102 depicted in FIG. 1 are omitted from the portion 200A depicted in FIG. 2A.

The multifunctional device layer portion 200A may include a lightguide substrate 208, which may be formed of the same or similar material(s) as the lightguide substrate 112 depicted in FIG. 1. The lightguide substrate 208 may have one or more optical patterns 210 or other light extraction features formed in a surface of the lightguide substrate 208. The surface of the lightguide substrate 208 in which the optical patterns or other light extraction features are formed may correspond to the patterned surface 112B of the lightguide substrate 112 depicted in FIG. 1.

The optical pattern 210 may be formed in the surface of the lightguide substrate 208 using a stamping or ablation process. Additionally, or alternatively, a material may be applied to the lightguide substrate 208 using a roll-to-roll or deposition process, and the optical pattern 210 may be embossed onto this material. The optical pattern 210 may include printed dots, surface roughening, round shapes, lenses, trapezoidal shapes, ridges, curved surfaces, or any other surface shapes or patterns that may cause light in the lightguide substrate 208 to be diffracted in a desired direction (e.g., towards a display stack).

As described in reference to FIG. 1, a first surface and/or a second surface of the lightguide substrate 208 may be coated with a respective material. For example, a non-patterned surface of the lightguide substrate 208 may be coated with a low refractive index material 206 and a surface of the lightguide substrate 208 having the optical pattern 210 formed therein may be coated with a low refractive index material 212. The coatings 206, 212 may correspond, for example, to the coatings 112, 114 depicted in FIG. 1, respectively. As previously described, the coating materials 206, 212 may have respective refractive indices that are each less than a refractive index of the material from which the lightguide substrate 208 is formed.

In certain example embodiments, one or more touch-sensing components 202 forming part of a touch sensor layer 204 may be formed on the coating 206 applied to the non-patterned surface of the lightguide substrate 208. As described in reference to the touch sensor layer 108, the touch sensor layer 204 may include a resistive or capacitive touch sensor. The touch-sensing components 202 may be, for example, individual conductive electrodes or rows or columns of conductive electrodes (e.g., sensor lines).

While the touch-sensing components 202 are depicted in FIG. 2A as being formed on the coating 206, in certain example embodiments, an interstitial layer (not shown) may first be deposited on the coating material 206, and the touch-sensing components 202 may be formed on this interstitial layer. The interstitial layer may be incorporated to facilitate bonding of the touch sensor layer 204 to the lightguide substrate 208.

Figure 2B:
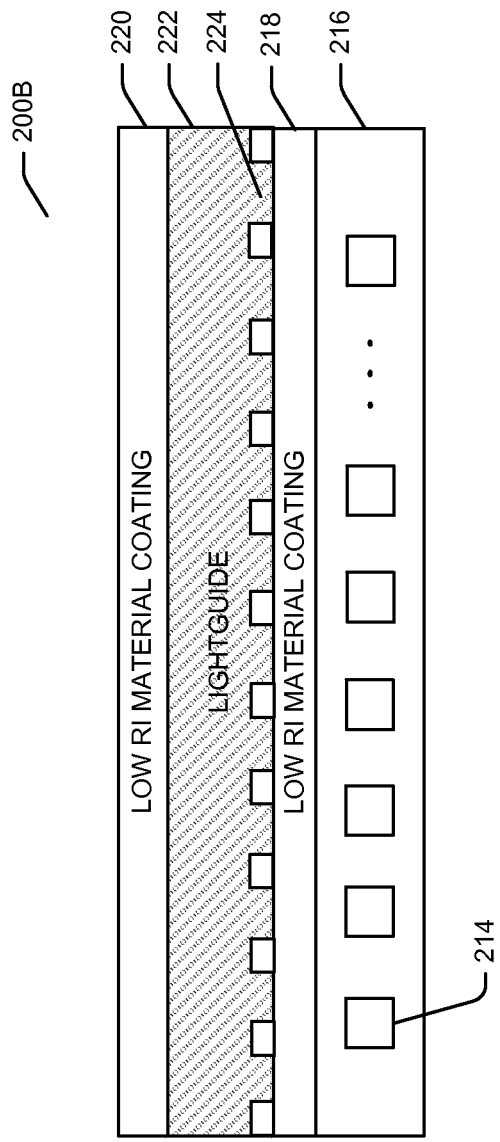

FIG. 2B is a schematic cross-section of a portion 200B of a multifunctional device layer in accordance with one or more other example embodiments of the disclosure. For ease of explanation, certain portions of the structure of the multifunctional device layer 102 depicted in FIG. 1 are omitted from the portion 200B depicted in FIG. 2B.

The multifunctional device layer portion 200B may include a lightguide substrate 222, which may be formed of the same or similar material(s) as the lightguide substrate 112 depicted in FIG. 1 or the lightguide substrate 208 depicted in FIG. 2A. The lightguide substrate 222 may have one or more optical patterns 224 or other light extraction features formed in a surface of the lightguide substrate 222.

As described in reference to FIG. 1, a first surface and/or a second surface of the lightguide substrate 222 may be coated with a respective material. For example, a non-patterned surface of the lightguide substrate 222 may be coated with a low refractive index material 220 and a surface of the lightguide substrate 222 having the optical pattern 224 formed therein may be coated with a low refractive index material 218. The material(s) used to form the coatings 220, 218 may be the same or similar to the material(s) used to form the coatings 112, 114 depicted in FIG. 1, respectively. As previously described, the coating materials 220, 218 may have respective refractive indices that are each less than a refractive index of the material from which the lightguide substrate 222 is formed.

In certain example embodiments, one or more touch-sensing components 214 forming part of a touch sensor layer 216 may be formed on the coating 218 applied to the patterned surface of the lightguide substrate 222. As described in reference to the touch sensor layer 108, the touch sensor layer 216 may include a resistive or capacitive touch sensor. The touch-sensing components 214 may be, for example, individual conductive electrodes or rows or columns of conductive electrodes (e.g., sensor lines).

While the touch-sensing components 214 are depicted in FIG. 2B as being formed on the coating 218, in certain example embodiments, an interstitial layer (not shown) may first be deposited on the coating material 218, and the touch-sensing components 214 may be formed on this interstitial layer. The interstitial layer may be incorporated to facilitate bonding of the touch sensor layer 216 to the lightguide substrate 222.

Illustrative Process

Figure 3:
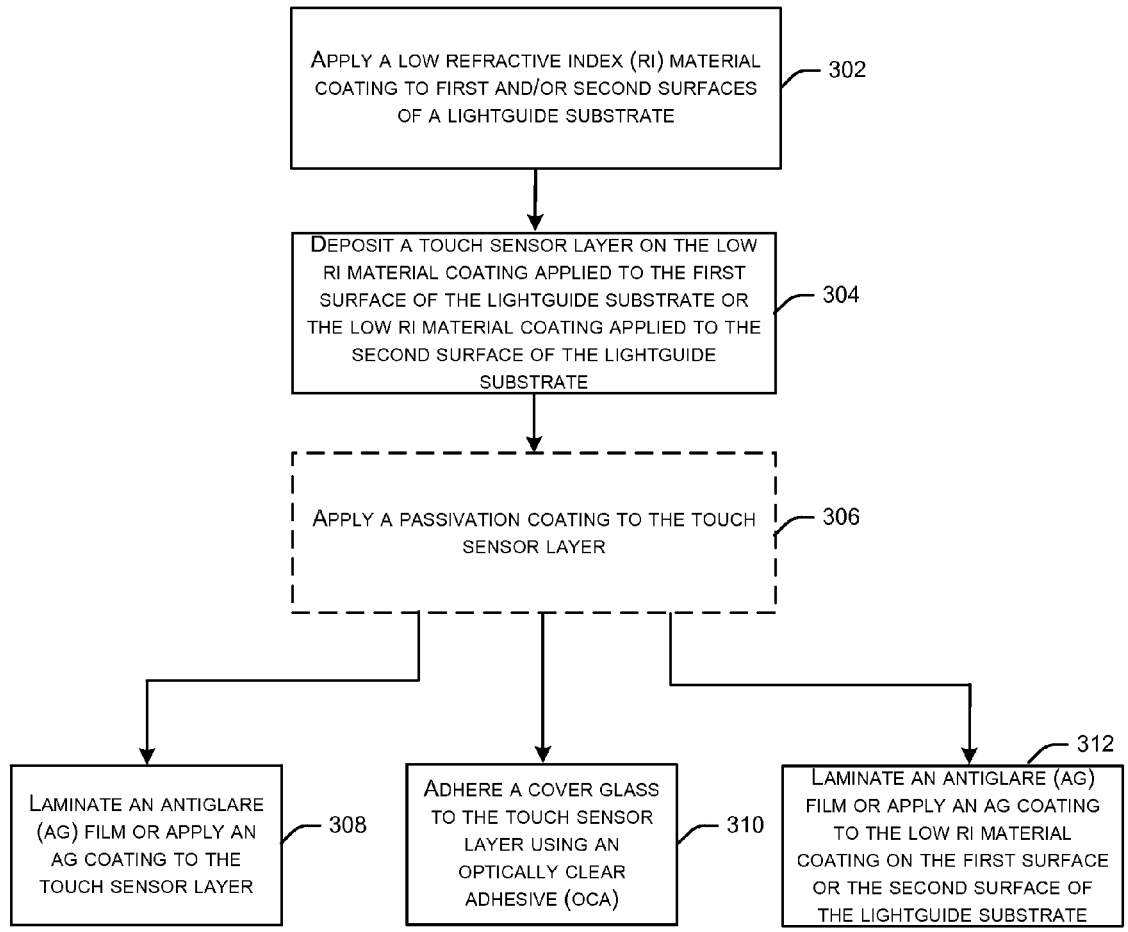
FIG. 3 is a process flow diagram of an illustrative method for forming a multifunctional device layer in accordance with one or more example embodiments of the disclosure.

FIG. 3 is a process flow diagram of an illustrative method 300 for forming a multifunctional device layer in accordance with one or more example embodiments of the disclosure.

At block 302, a low refractive index material may be applied to first and/or second surfaces of a lightguide substrate. For example, a material having a lower refractive index than a material from which the lightguide substrate is formed may be applied to a non-patterned surface of the substrate and/or to an opposing patterned surface of the substrate. In certain example embodiments, only one of the patterned or non-patterned surfaces may be coated with a low refractive index material. For example, only the non-patterned surface may be coated.

At block 304, a touch sensor layer may be formed on the low refractive index coating applied to the first surface of the lightguide substrate or the low refractive index coating applied to the second surface of the lightguide substrate. For example, the touch sensor may be formed on the coating applied to the non-patterned surface of the lightguide substrate or to the coating applied to the patterned surface of the lightguide substrate. The touch sensor layer may include any of the types of sensors and may be formed using any of the types of processes previously described. In order to improve adhesion of the touch sensor layer to the lightguide substrate, in certain example embodiments, one or more interstitial layers may be formed on the low refractive index coating and the touch sensor layer may be formed on the interstitial layer(s).

At block 306, a passivation coating may optionally be applied to the touch sensor layer. The material chosen for the passivation coating may have a dielectric constant that enables the touch sensor layer to detect multi-touch gestures.

From block 306, the method 300 may proceed to one of blocks 308, 310, or 312 depending on whether the touch sensor layer is provided on the top side (e.g., the side facing towards a viewer) or a bottom side (the side facing away from the viewer) of the lightguide substrate. At block 308, an anti-reflective coating and/or anti-glare coating may be applied to the touch sensor layer. For example, a resin having anti-reflective and/or anti-glare properties may be coated on the touch sensor layer. In certain example embodiments, the resin may be blended with a material having ultraviolet (UV) light filtering properties. In other example embodiments, an anti-glare/anti-reflective UV cut film may be laminated on the touch sensor layer. The operation(s) at block 308 may be performed if the touch sensor layer is provided on a top side of the lightguide substrate. At block 310, a cover glass may be adhered to the touch sensor layer using an OCA. In those example embodiments in which the cover glass is adhered to the touch sensor layer using an OCA, an anti-glare/anti-reflective film or coating may not be applied to the touch sensor layer. The operation(s) at block 310 may be performed in those example embodiments in which the touch sensor layer is provided on a top side of the lightguide substrate. At block 312, an anti-glare/anti-reflective coating (potentially with UV light filtering properties) may be applied to the low refractive index material coating on the first surface of the lightguide substrate or the low refractive index material coating on the second surface of the lightguide substrate. The operation(s) at block 312 may be performed in those example embodiments in which the touch sensor layer is provided on a bottom side of the lightguide substrate. As such, the anti-glare/anti-reflective coating may be applied to the coated non-patterned surface of the lightguide substrate.

It should be appreciated that, in certain example embodiments, at least a portion of the operations may be carried out in parallel. Furthermore, in certain example embodiments, less, more, or different operations than those depicted in FIG. 3 may be performed.

Illustrative Device Architecture

Figure 4:
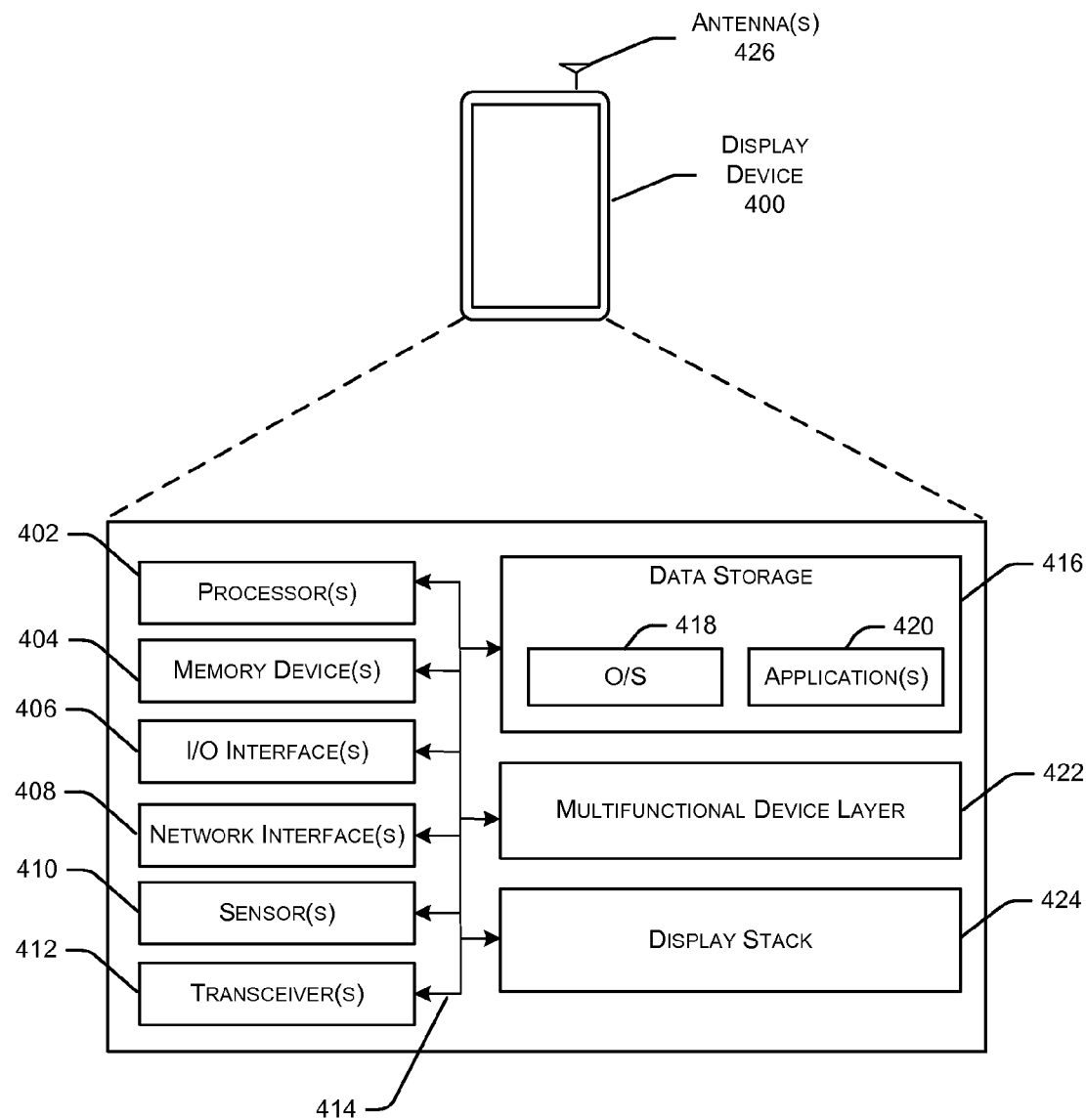
FIG. 4 is a schematic diagram of an illustrative electronic device that incorporates a multifunctional device layer in accordance with one or more example embodiments of the disclosure.

FIG. 4 is a schematic diagram of an illustrative electronic device 400 that incorporates a multifunctional device layer in accordance with one or more example embodiments of the disclosure. The device 400 may be, for example, a smartphone device, a tablet device, a wearable computing device, or the like. The device 400 may also be a non-mobile device such as, for example, a laptop computer, a computer monitor, or the like. It should be appreciated that the above examples are merely illustrative and not exhaustive and that the device 400 may be any suitable device into which a multifunctional device layer in accordance with example embodiments of the disclosure may be incorporated.

In an illustrative configuration, the device 400 may include one or more processors 402, one or more memory devices 404 (generically referred to herein as memory 404), one or more input/output ("I/O") interface(s) 406, one or more network interfaces 408, one or more sensors or sensor interfaces 410, one or more transceivers 412, data storage 416, a multifunctional device layer 422, and a display stack 424. The device 400 may further include one or more buses 414 that may functionally couple various components of the device 400. In certain example embodiments, the device 400 may include one or more antennas 426 including, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The multifunctional device layer 422 may include layer structures previously described. The multifunctional layer 422 may be adhered to the display stack 424 using, for example, an OCA. Alternatively, a low refractive index material coating applied to a patterned surface of a lightguide substrate of the layer 422 may also serve as an OCA for adhesion of the layer 422 to the display stack 424. Further, although not depicted in FIG. 4, the device 400 may include control circuitry that may, in turn, include driving circuitry for driving thin-film transistors (TFTs) of a TFT substrate of the display stack 424 (or other drivable elements of the display stack 424), a touch controller for detecting touch events and mapping the touch events to coordinates of a touch sensor, and so forth.

Referring now to other components of the device 400, the bus(es) 414 may include at least one of a system bus, a memory bus, an address bus, or a message bus, and may permit exchange of information (e.g., data (including computer-executable code), signaling, etc.) between various components of the device 400. The bus(es) 414 may include, without limitation, a memory bus or a memory controller, a peripheral bus, an accelerated graphics port, and so forth. The bus(es) 414 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 of the device 400 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 416 may include removable storage and/or non-removable storage including, but not limited to, magnetic storage, optical disk storage, solid-state storage, and/or tape storage. The data storage 416 may provide non-volatile storage of computer-executable instructions and other data. The memory 404 and the data storage 416, removable and/or non-removable, are examples of computer-readable storage media (CRSM) as that term is used herein.

The data storage 416 may store computer-executable code, instructions, or the like that may be loadable into the memory 404 and executable by the processor(s) 402 to cause the processor(s) 402 to perform or initiate various operations. The data storage 416 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404, and may ultimately be copied to data storage 416 for non-volatile storage.

More specifically, the data storage 416 may store one or more operating systems (O/S) 418 and one or more applications 420, program modules, or the like. Any applications 420 stored in the data storage 416 may be loaded into the memory 404 for execution by the processor(s) 402. Further, any data (not shown) stored in the data storage 416 may be loaded in to the memory 404 for use by the processor(s) 402 in executing computer-executable code.

The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 416, the O/S 418 may be loaded from the data storage 416 into the memory 404 and may provide an interface between application(s) 420 executing on the device 400 and hardware resources of the device 400. More specifically, the O/S 418 may include a set of computer-executable instructions for managing hardware resources of the device 400 and for providing common services to application programs (e.g., managing memory allocation among various application programs). The O/S 418 may include any operating system now known or which may be developed in the future including, but not limited to, any server operating system, any mainframe operating system, or any other proprietary or non-proprietary operating system.

The input/output (I/O) interface(s) 406 may facilitate the receipt of input information by the device 400 from one or more I/O devices as well as the output of information from the device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more of the antenna(s) 426 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 400 may further include one or more network interfaces 408 via which the device 400 may communicate with any of a variety of other systems, platforms, networks, devices, and so forth. Such communication may occur via one or more networks including, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The sensor(s)/sensor interface(s) 410 may include or may be capable of interfacing with any suitable type of sensing device such as, for example, ambient light sensors, inertial sensors, force sensors, thermal sensors, image sensors, magnetometers, and so forth. Example types of inertial sensors may include accelerometers (e.g., MEMS-based accelerometers), gyroscopes, and so forth. In certain example embodiments, the multifunctional device layer 422 may include one or more sensors as well (e.g., any of the touch sensors previously described).

The antenna(s) 426 may include any suitable type of antenna depending, for example, on the communications protocols used to transmit or receive signals via the antenna(s). Non-limiting examples of suitable antennas may include directional antennas, non-directional antennas, dipole antennas, folded dipole antennas, patch antennas, multiple-input multiple-output (MIMO) antennas, or the like. The antenna(s) 426 may be communicatively coupled to one or more transceivers or radio components (not shown) to which or from which signals may be transmitted or received.

As previously described, the antenna(s) 426 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMAX, etc.), direct satellite communications, or the like.

The antenna(s) 426 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 4 GHz channels (e.g. 802.11n, 802.11ac), or 60 GHZ channels (e.g. 802.11ad). In alternative example embodiments, the antenna(s) 426 may be configured to transmit or receive radio frequency signals within any suitable frequency range forming part of the unlicensed portion of the radio spectrum.

The antenna(s) 426 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 412 may include any suitable radio component(s) for—in cooperation with the antenna(s) 426—transmitting or receiving radio frequency (RF) signals in the bandwidth and/or channels corresponding to the communications protocols utilized by the device 400 to communicate with other devices. The transceiver(s) 412 may include hardware, software, and/or firmware for modulating, transmitting, or receiving—potentially in cooperation with any of antenna(s) 426—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 412 may further include hardware, firmware, or software for receiving GNSS signals. The transceiver(s) 412 may include any known receiver and baseband suitable for communicating via the communications protocols utilized by the device 400. The transceiver(s) 412 may further include a low noise amplifier (LNA), additional signal amplifiers, an analog-to-digital (A/D) converter, one or more buffers, a digital baseband, or the like.

It should be appreciated that the device 400 may include alternate and/or additional hardware, software, or firmware components beyond those described or depicted without departing from the scope of the disclosure. More particularly, it should be appreciated that software, firmware, or hardware components depicted as forming part of the device 400 are merely illustrative and that some components may not be present or additional components may be provided in various embodiments.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or device component may be performed, at least in part, by another device or device component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

That which is claimed is:

1. An electronic device, comprising:
  a reflective display layer;
  at least one memory storing content;
  at least one processor operatively coupled to the at least one memory and the reflective display layer, wherein the at least one processor is configured to control the reflective display layer to cause the reflective display layer to present an image representative of the content;
  one or more light sources; and
  a multifunctional device layer operatively coupled to the at least one processor, wherein the multifunctional device layer comprises:
    a lightguide substrate having a first surface and a second surface that opposes the first surface, wherein the lightguide substrate receives light from the one or more light sources and the second surface of the lightguide substrate comprises an optical pattern that directs the light towards the reflective display layer,
    a first layer disposed on the first surface of the lightguide substrate and a second layer disposed on the second surface of the lightguide substrate, wherein the first layer comprises a first material having a first refractive index and the second layer comprises a second material having a second refractive index, wherein the first refractive index and the second refractive index are different from each other and are each less than a third refractive index of a third material of the lightguide substrate, an interstitial layer disposed on the first layer, wherein the interstitial layer comprises a fourth material having a fourth refractive index that is greater than or equal to the first refractive index of the first material;

a touch sensor layer comprising a plurality of conductive electrodes disposed on the interstitial layer, wherein the interstitial layer bonds the touch sensor layer to the lightguide substrate; and a third layer disposed over at least a portion of the plurality of conductive electrodes, wherein the third layer has at least one of an anti-glare property, an anti-reflective property, or an ultraviolet light filtering property.

2. The electronic device of claim 1, the multifunctional device layer further comprising a passivation layer disposed over at least a portion of the plurality of conductive electrodes, wherein the third layer is disposed on the passivation coating.

3. The electronic device of claim 1, wherein the first refractive index is less than the second refractive index.

4. A multifunctional device layer, comprising:
a lightguide substrate having a first surface and an opposing second surface;
a first layer disposed on the first surface of the lightguide, wherein the first layer comprises a first material having a first refractive index;
a second layer disposed on the second surface of the lightguide, wherein the second layer comprises a second material having a second refractive index, wherein the first refractive index is different from the second refractive index, and wherein the first refractive index and the second refractive index are each less than a third refractive index of a third material of the lightguide substrate;
an interstitial layer disposed on the first layer or the second layer, wherein the interstitial layer comprises a fourth material having a fourth refractive index that is greater than or equal to the first refractive index or the second refractive index; and
a touch layer disposed on the interstitial layer, wherein the interstitial layer bonds the touch layer to the lightguide substrate.

5. The multifunctional device layer of claim 4, wherein the touch layer is disposed on the first layer, and wherein the second layer is adhered to a display stack of a display device that includes the multifunctional device layer.

6. The multifunctional device layer of claim 4, wherein the first refractive index is less than the second refractive index.

7. The multifunctional device layer of claim 4, further comprising a third layer comprising a fourth material having at least one of an anti-glare property, an anti-reflective property, or a UV light filtering property.

8. The multifunctional device layer of claim 7, wherein the third layer is disposed on the first layer and the touch layer is disposed on the second layer.

9. The multifunctional device layer of claim 7, wherein the third layer is disposed on the touch layer.

10. The multifunctional device layer of claim 9, further comprising a passivation layer disposed on the touch layer, wherein the third layer is disposed on the passivation layer.

11. The multifunctional device layer of claim 4, further comprising a cover glass and an optically clear adhesive (OCA) layer, wherein the OCA layer adheres the cover glass to the touch layer.

12. The multifunctional device layer of claim 4, wherein the first surface or the second surface of the lightguide substrate comprises an optical pattern for directing light from the lightguide substrate towards a display stack of a display device that includes the display device stack.

13. A method, comprising:
providing a lightguide substrate having a first surface and an opposing second surface;
applying a first material to the first surface of the lightguide substrate to form a first layer, wherein the first material has a first refractive index;
applying a second material to the second surface of the lightguide substrate to form a second layer, wherein the second material has a second refractive index that is different from the first refractive index, and wherein each of the first refractive index and the second refractive index are less than a third refractive index of a third material of the lightguide substrate; and
forming an interstitial layer on the first layer or the second layer, wherein the interstitial layer comprises a fourth material having a fourth refractive index that is greater than or equal to the first refractive index or the second refractive index; and
forming a touch layer on the interstitial layer, wherein the touch layer comprises a plurality of touch-sensing components and wherein the interstitial layer bonds the touch layer to the lightguide substrate.

14. The method of claim 13, wherein the first refractive index is less than the second refractive index.

15. The method of claim 13, wherein the touch layer is disposed on the second layer, the method further comprising applying a fourth material to the first layer to form a third layer, the fourth material having at least one of an anti-glare property, an anti-reflective property, or a UV light filtering property.

16. The method of claim 13, further comprising:
applying a passivation coating to the touch layer; and
applying a fourth material to the passivation coating to form a third layer, the fourth material having at least one of an anti-glare property, an anti-reflective property, or a UV light filtering property.

17. The method of claim 13, further comprising forming one or more optical features in the first surface of the lightguide substrate or the second surface of the lightguide substrate.

* * * * *